United States Patent [19]
Högdahl

[11] Patent Number: 5,618,170
[45] Date of Patent: Apr. 8, 1997

[54] ROTARY MOTOR

[75] Inventor: Erland Högdahl, Svensbyn, Sweden

[73] Assignee: Hogdahl Innovation Aktiebolag, Svensbyn, Sweden

[21] Appl. No.: 522,370

[22] PCT Filed: Mar. 11, 1994

[86] PCT No.: PCT/SE94/00206

§ 371 Date: Dec. 18, 1995

§ 102(e) Date: Dec. 18, 1995

[87] PCT Pub. No.: WO94/21894

PCT Pub. Date: Sep. 29, 1994

[30]   Foreign Application Priority Data

Mar. 18, 1993 [SE] Sweden .................................. 9800894

[51] Int. Cl.$^6$ ................................ F01C 19/00; F01C 1/00
[52] U.S. Cl. ............................ 418/106; 418/262; 418/266
[58] Field of Search ............................ 418/13, 106, 260, 418/267, 264, 266; 123/236

[56]   References Cited

U.S. PATENT DOCUMENTS

| | | | |
|---|---|---|---|
| 643,432 | 2/1900 | Washington et al. .................... | 418/260 |
| 712,456 | 10/1902 | Janssen .................................... | 418/264 |
| 1,078,168 | 11/1913 | Ruhlmann ................................ | 418/262 |
| 1,995,755 | 3/1935 | Smith ....................................... | 418/260 |
| 5,359,971 | 11/1994 | Haven ...................................... | 418/266 |

*Primary Examiner*—Charles G. Freay
*Attorney, Agent, or Firm*—John Lezdey & Associates

[57]   ABSTRACT

The present invention discloses a rotary machine, such as a motor or a pump, which works with a fluid in the form of a gas or a liquid. The rotary machine comprises a housing, an annular passageway arranged in the housing, and at least two rotor-driven blades which run in the annular passageway and which are movable radially in the rotor. The passageway includes a fluid inlet, a fluid outlet and a constriction located therebetween in the passageway. The radial movement of the blades is guided forcibly past the constriction. Each blade is pivotally connected to a counterweight arranged on an arm. The arm is pivotally journalled on the rotor between the counterweight and the pivotal blade connection.

8 Claims, 2 Drawing Sheets

ROTARY MOTOR

BACKGROUND OF THE INVENTION

The present invention relates to a rotary machine, such as a motor or a pump.

Rotary machines of this kind that works as a motor or a pump having long been known to the art. The blades or vanes working in the passageway of the rotary machine are held by means of springs in a normal position against the peripheral outer wall of the passageway, against which the blades slide as the rotor rotates. The blades are also subjected to centrifugal forces as the rotor rotates, these forces increasing with increasing rotor speeds. Consequently, the frictional forces generated between blade and chamber wall will therefore also increase, as will also wear on the blades. In turn, this results in power losses. To eliminate this drawback with this type of rotary machine to the best possible extent, movement of the blades can be guided with the aid of camming curves, for instance, c.f. French Patent Specification 1,605,224, or by journalling the pistons excentrically in relation to the centre of rotation, c.f. Swedish Patent Specification 43,515. In addition to the high tolerance requirements that are necessitated by such cams and eccentrics, the cams and eccentrics also take-up the centrifugal forces and are therewith also subjected to friction and wear.

An object of the present invention is to eliminate these drawbacks, which is achieved in accordance with the invention with a rotary machine having the characteristic features set forth in the following claims.

DESCRIPTION OF THE DRAWINGS

The invention will now be described in more detail with reference to exemplifying embodiments thereof and also with reference to the accompanying drawing, in which.

DESCRIPTION OF THE PREFERRED EMBODIMENTS

Figure 1:
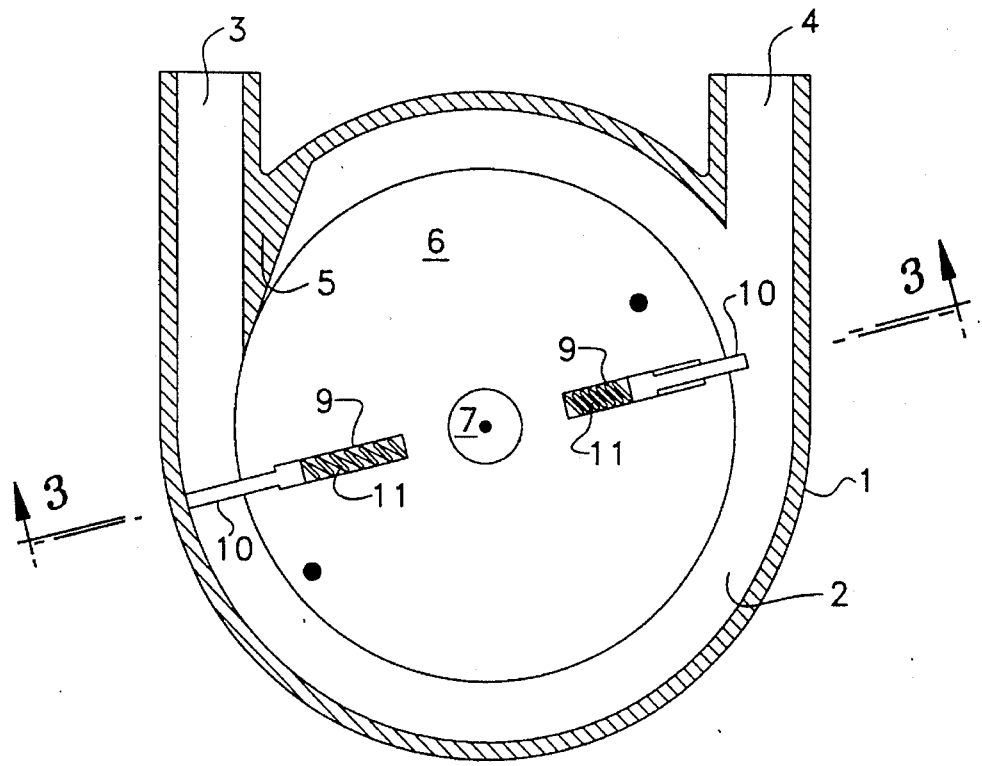
FIG. 1 is a schematic sectional view taken on the line I—I in FIG. 3.

The illustrated exemplifying embodiment includes a housing 1 having a generally circular-cylindrical shape and including a peripherally extending passageway 2. The passageway 2 includes a fluid inlet 3 and a fluid outlet 4, wherein the fluid concerned may be liquid or a gas for instance. A constriction 5 is located in the proximity of the inlet 3, between said inlet and the outlet 4. The housing 1 accommodates a rotor 6 which is mounted on a shaft 7 rotatably journalled in bearings 8 in the housing 1. The rotor 6 is disc-shaped and may have any desired thickness, and the sides of the rotor are extended radially to form the passageway 2 between said rotor and the peripheral wall of the housing.

In the case of the illustrated embodiment, the rotor includes two diametrically opposed slots 9, each of which receives a flat slide or blade 10, which is held in position with its outer edge tangential to the peripheral wall of the housing, by a spring 11. It will be understood that the blade, or vane, 10 is configured so as to completely cover or fill the profile of the passageway 2 defined between the housing 1 and the rotor 6, and may be sealingly displaced in a radial direction.

Figure 2:
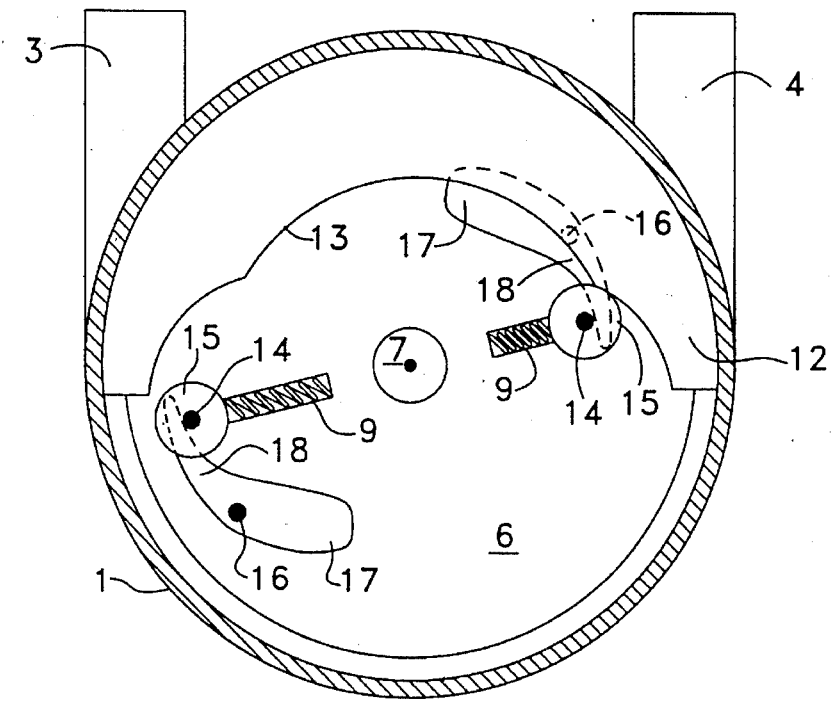
FIG. 2 is a schematic sectional view of the inventive rotary machine taken on the line II—II in FIG. 3.
Figure 3:
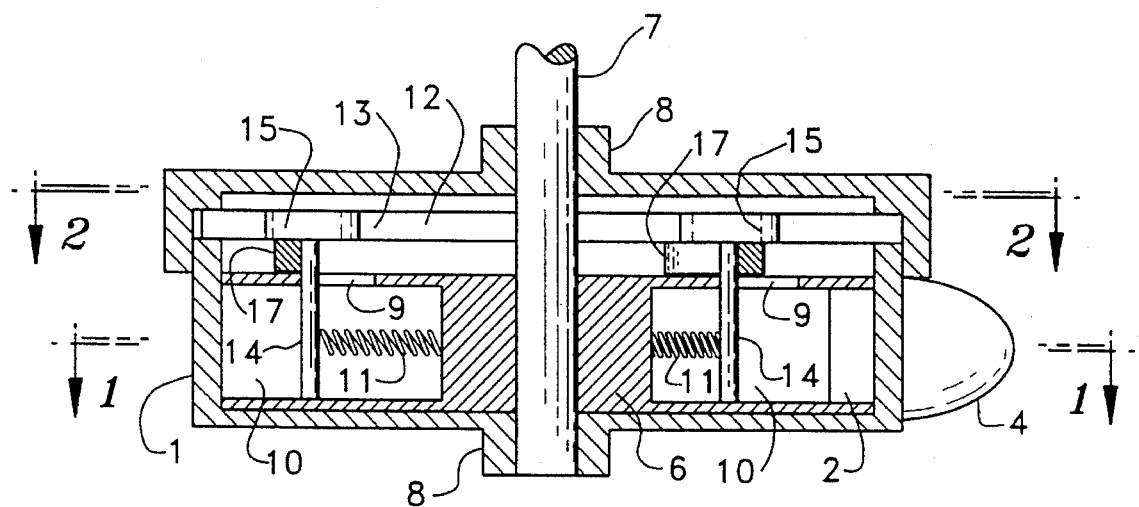
FIG. 3 is a schematic cross-sectional view of the inventive rotary machine taken on the line III—III in FIG. 2.

FIG. 2 illustrates a cam 12 which has a curve 13 formed in a certain manner, and which is fixedly mounted on the housing 1. Each blade 10 is provided with a respective axle 14 which extends through a slot in the side of the rotor 6 and beyond said slot, and which carries a roller 15 externally of the rotor on a level with the cam 12.

As the rotor 6 rotates, the roller 15 engages the cam 12 and runs along the curve 13. Because the roller 15 is connected with the blade 10, the blade will follow the radial movement of the axle 14, i.e. the blade is drawn into the rotor 6 upstream of the outlet 4—see FIG. 1—and is held withdrawn during its passage past the restriction 5, whereafter the cam releases the roller, and therewith the axle 14, so that the blade will again fills the cross-sectional area of the passageway 2.

The rotor 6 also includes two trunnions 16 which each pivotally support a counterweight 17. The opposite part 18 of the counterweight 17, or the arm of said counterweight, which is opposite in relation to the trunnion 16 coacts with the associated blade, for instance via its shaft 14 as illustrated in FIG. 2. The arm 18 thus lies against the shaft 14 on the radially outer side thereof in relation to the rotor 6 and is therewith able to slide against the shaft. As the rotor 6 rotates, the counterweights 17 are therewith splayed radially outwards by the centrifugal forces acting thereon. As a result of journalling the arm 18 at 16 and connecting the arm to the blade 10 through the shaft 14, the oppositely acting moment of force exerted by the arm 18 on the counterweight 17 will balance the centrifugal force acting on the blade 10 including the shaft 14 and the roller 15. The mass of the counterweight 17 can be adapted to obtain optimal coaction between the blade 10 and the housing wall defining the passageway 2, with regard to sealing and friction. In addition, the driving forces of the rollers on the cam 12 are also reduced, which further optimizes the function of the inventive rotary machine.

Figure 4:
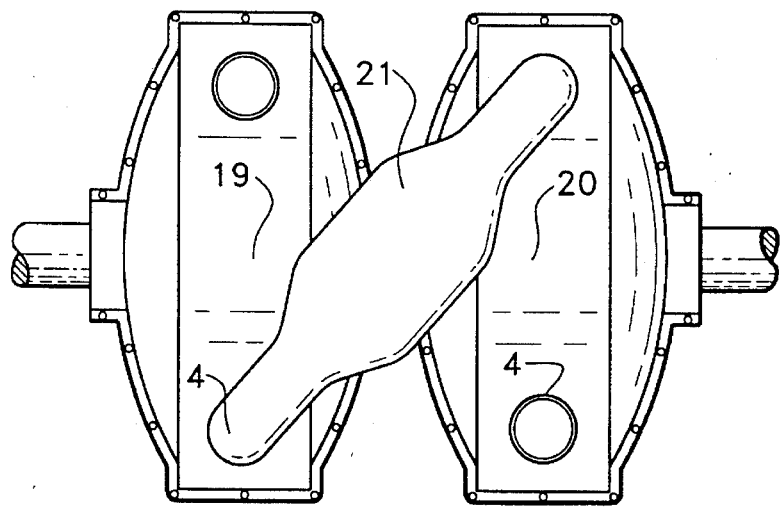
FIG. 4 illustrates schematically a practical application of the invention.

FIG. 4 illustrates a practical application of the invention. The reference numeral 19 identifies an air pump or compressor, and the reference numeral 20 identifies a motor constructed in accordance with the principles of the present invention. As with the preceding illustrations, the reference numerals 3 and 4 identify respectively the inlets and outlets of the two units. The outlet of the compressor 19 is connected to the inlet of the motor 20 by a combustion chamber 21. The rotors of the compressor 19 and the motor 20 are mounted on a common shaft 7. In operation, air of combustion is thus drawn in through the inlet 3 and compressed for ignition in the combustion chamber 21. The hot gases of combustion are passed through the inlet 3 of the motor 20 so as to drive the rotor thereof, and exit through the outlet 4. The shaft 7 drives suitably a fuel pump for delivering fuel to the combustion chamber 21, in which the fuel is ignited. It will be understood that FIG. 4 merely illustrates the principle of one application of the invention, and it is not intended to describe in this document such data as passage dimensions and speed. A gear may be mounted between the compressor and the motor.

It will also be understood that the illustrated and described embodiment of the invention can be modified and varied in several ways within the scope of the invention and that the drawings do not illustrate the ultimate constructive solution of the inventive rotary machine with regard to mounting or fitting the various components, or the placement of packings and seals, etc. Such constructional details are conventional details which belong to the designer. The rotary machine can be provided with more than two blades, in accordance with conventional techniques. It will also be understood that the housing may be rotatable and the rotor stationary in accordance with conventional methods and conventional principles, in which case the inlet and the outlet will extend from the axle centre radially within the stationary rotor and discharge into the passageway. The outlet will extend from the axle centre radially within the stationary rotor and discharge into the passageway. The aforesaid cam and cam roller or cam follower may also conveniently be arranged symmetrically on the other side of the rotor, to obtain a more uniform force distribution and less wear.

I claim:

1. A rotary machine for use with a fluid, said machine comprising:
 - a housing having an inlet, an outlet and an annular passageway associated with said inlet and said outlet, said passageway having a constriction; at least one rotor mounted in said passageway; at least two arms pivotally mounted on said rotor; a counterweight mounted on each of said arms; and a blade pivotally abutting each of said counterweights, said blades being movable radially in said rotor; wherein movement of said blades is guided forcibly past said constriction.

2. A rotary machine according to claim 1, including a slot in said rotor, wherein each blade is provided with a shaft having at least two sides which extends through said rotor and through said slot such that one side of said shaft faces toward a periphery of said rotor, and wherein a part of said arm lies freely against said side of said shaft which faces toward said rotor periphery.

3. A rotary machine according to claim 2, including cam means mounted on said housing and wherein said shaft carries a roller which engages said cam such as to guide the blade forcibly past said constriction.

4. The rotary machine of claim 1 which is a pump.

5. The rotary machine of claim 1 wherein said constriction is near said inlet.

6. The rotary machine of claim 1 wherein the rotor is disc-shaped and the sides of the rotor extend radially to form a passageway.

7. The rotary machine of claim 1 wherein the blades substantially fill the profile of said passageway.

8. The rotary machine of claim 1 including a pair of trunnions pivotally supporting each counterweight.

* * * * *